July 23, 1929.  F. A. PARSONS  1,721,668
MEANS FOR MOVING MACHINE TOOL SUPPORTS
Filed May 27, 1926
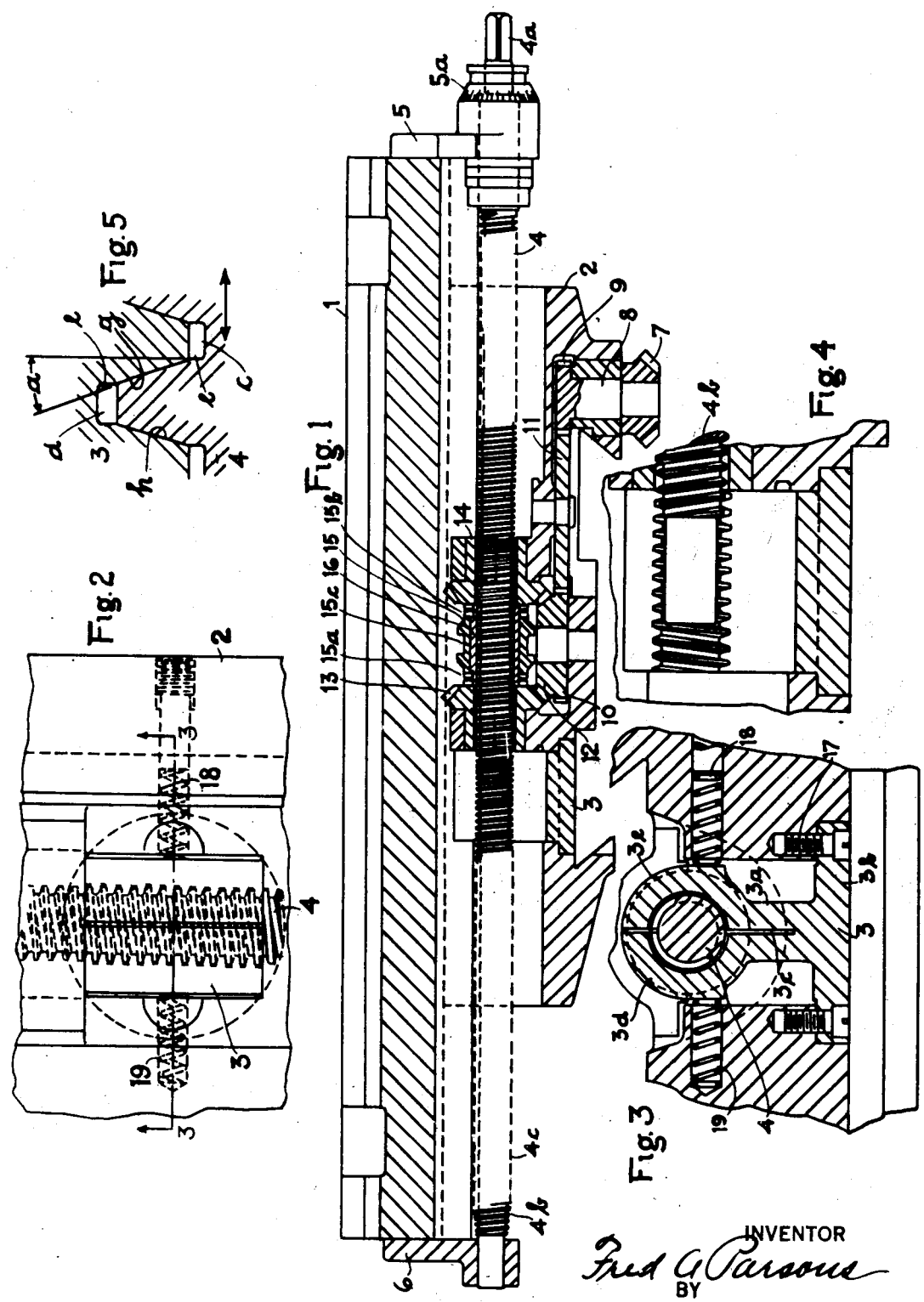
INVENTOR
Fred A. Parsons
BY
ATTORNEY Patented July 23, 1929.

1,721,668

UNITED STATES PATENT OFFICE.

FRED A. PARSONS, OF MILWAUKEE, WISCONSIN, ASSIGNOR TO KEARNEY & TRECKER CORPORATION, OF WEST ALLIS, WISCONSIN.

MEANS FOR MOVING MACHINE-TOOL SUPPORTS.

Application filed May 27, 1926. Serial No. 111,947.

This invention relates to metal working machines and more particularly to improved devices for the movement of the tables or movable supports in such machines.

Such supports are ordinarily movable by means including a screw and nut which during the course of the operative life of the machine are subject to wear so that no matter how closely the screw and nut are originally fitted in the manufacture of the machine it eventually occurs that a certain amount of endwise axial movement of the screw may take place relative to the nut. Such endwise movement or lost motion is very undesirable for a variety of reasons. When the parts are provided with a graduated dial which should indicate movement of the support accurately, any looseness between the screw and the nut renders the dial inaccurate in its readings. Furthermore such looseness may permit chatter or vibration to take place between the screw and its nut which in turn causes or permits chatter or vibration of the support. It is an object of this invention to provide means which will continuously and automatically prevent any looseness or lost motion between the screw and nut.

It seldom occurs that the screw wears equally throughout its length because the support may be used for long periods through only a part of its stroke or travel or may be more used through a given portion of its travel and it is a further object of this invention to provide means which will automatically compensate for any wear between the screw and its nut and is so constructed as to also compensate for unequal wear.

Another object is generally to improve and simplify the construction and operation of means for moving the supports of machine tools.

The invention consists in the novel features of construction and arrangement and in the combination of parts as hereinafter particularly described and claimed.

In the accompanying drawings the same reference characters are used to designate the same parts in each of the several views.

Fig. 1 is a vertical section through a movable machine tool support and its actuating mechanism. In this instance the support shown is the table of a knee and column type of milling machine, and this being a well known type of machine tool, many parts not necessary to illustrate this invention are omitted.

Fig. 2 is an enlarged plan view of a nut shown in Fig. 1 together with portions of the associated parts.

Fig. 3 is a transverse section along line 3—3 of Fig. 2.

Figs. 4 and 5 illustrate certain details of construction as will be explained.

The table or support 1 is movable in a suitable slide or guide of any of several well known forms, associated with the saddle 2. Fixed with saddle 2 is a nut 3 of peculiar construction as will hereafter be more particularly described, the nut being engaged by a screw 4 journaled in brackets 5 and 6 fixed on the end of the table 1 and the screw being rotatable in the brackets but prevented from axial movement relative to the table 1, the axis of the screw being disposed parallel to the path of movement of the table 1 on saddle 2, and the screw being provided with a graduated dial 5$^a$ of the usual form.

For the manual rotation of screw 4, a squared end portion 4$^a$ is provided which is adapted to receive a hand crank not shown. The screw may be power rotated by means of a train of gearing. A variety of trains of gearing for this purpose being well known, only a portion of the gear train is here shown, consisting of a bevel gear 7 adapted to be driven from any suitable power source and fixed on a shaft 8 upon which is also fixed a spur gear 9 which drives a spur gear 10 through an intermediate gear 11. Fixed upon or integral with gear 10 is a bevel gear 12 meshing with oppositely disposed bevel gears 13 and 14 whereby gears 13 and 14 are driven in opposite directions whenever gear 7 is actuated. Interposed between the bevel gears 13 and 14 is a clutch member 15 having upon its opposite ends the clutch teeth 15$^a$ and 15$^b$. The clutch member 15 is slidably keyed to a sleeve 16 closely but rotatably fitted between opposed faces of beveled gears 13 and 14 and slidably keyed to the screw 4. The clutch member 15 may be shifted in either direction by any of several well known means which may include a fork not shown, engaging with an annular groove or spool 15$^c$. The gears 13 and 14 are respectively provided with clutch teeth complimentary to the clutch teeth 15$^a$ and 15$^b$ and adapted to be engaged thereby when clutch member 15 is suitably shifted, whereby clutch member 15 may be positively driven from either gear, thus rotating the screw 4 in the one or the other direction according to the direction of engagement, by the means of power derived from the gear 7.

When screw 4 is rotated either manually or by power the table 1 is moved in the one or the other direction relative to saddle 2 according to the direction of rotation of the screw. Fig. 5 is an enlarged section showing a portion of the screw and nut in contact, the section being taken in a plane coinciding with the axis of the screw. The double head arrow indicates the direction of extension of the axis of the screw, and also the directions of thrusts tending during operation of the machine to resist the relative movement of the screw and nut when the screw is rotated, or tending to cause relative movement of the screw and nut when the screw is stationary. Of the two thrust faces $g$ and $h$ of the screw thread shown, the effective portion of at least one face stands at an angle with a plane at right angles to the screw axis, as indicated by angle $a$, whereby movement of the nut portion complimentary thereto toward the screw axis causes the nut portion to fit the screw thread closely and take up or compensate for any lost motion which might otherwise exist between them in either direction of the arrow. Space is provided in the screw and nut as at $c$ and $d$ to permit such relative movement by removing portions of the screw and nut. The sides $e$ of the grooves formed by such removal of material are substantially parallel to a plane at right angles to the axis of the screw, whereby wear of the complimentary angular surfaces permits the nut portion to move forward without the necessity of wearing away other portions not previously in contact, since such necessity might prevent the desired result.

The nut 3 is provided with a shank portion $3^a$ (see Fig. 3) having an enlargement or flange $3^b$ fixed in saddle 2 by means of screws such as screw 17. A slot $3^c$ divides that portion of the nut which engages the screw 4 whereby two nut portions $3^d$ and $3^e$ are formed which by the construction shown are each movable relative to one another and relative to the screw 4 in a direction transverse to the axis of the screw, the unslotted portion $3^a$ and flange $3^b$ providing in effect a spring connecting the portion $3^d$ and $3^e$ whereby such movement may take place. When the bore of the nut is threaded for the screw the two sections $3^d$ and $3^e$ are separated somewhat by suitable means from the position they are expected to occupy when the nut engages the screw, and when released after threading, the two portions will spring together and the bore in one direction of its diameter will be smaller in a direction substantially at right angles to the plane of the slot $3^c$, the reduced diameter being substantially smaller than the corresponding or complimentary diameter of the screw 4 which is to be fitted therein. Thus when the screw is fitted in the nut the portions $3^d$ and $3^e$ will be moved apart although continuously urged toward one another and toward the screw and if any wear takes place between complementary parts of the screw and nut, the nut portions will move as previously described to maintain a close fitting relationship to the threads of the screw. If the screw wears more in one portion than in another of its axial length, the portions $3^d$ and $3^e$ will move toward one another to conform with the smaller screw diameter when the nut is in contact with such small diameter but will be moved apart by the screw to conform to the largest screw diameter when the nut is in contact with the largest diameter. In other words, the portions $3^e$ and $3^d$ of the nut will move in and out in a direction transverse to the screw axis to conform to any variations in screw diameter as the screw moves through the nut.

The end portion $4^b$ of the screw is made of substantially rduced thread diameter. In Fig. 4 is shown a section of the nut with the reduced screw end about to enter therein for purposes of assembly. The reduced screw portion may enter freely into the nut although, as previously mentioned, the one diameter of the nut is smaller than other portions of the screw. The screw diameter is gradually increased from the reduced diameter to the full diameter until at a position approximately indicated by the numeral $4^c$ in Fig. 1, the screw is of full diameter but since the increase is gradual, the reduced portion when turned in the nut, acts as a tapered wedge whereby the screw may be inserted in the nut without special means for springing the nut portions $3^d$ and $3^e$ apart.

Springs 18 and 19 may be provided as shown for additional means tending to force the nut portions into close contact with the screw in spite of irregularity in the screw diameter, either the springs 18 and 19 or the slotted construction of nut 3 previously described, or both together thus providing yieldable means continuously tending to move the nut portions $3^e$ and $3^d$ toward one another.

It will be noted that the angle $a$ in Fig. 5 is preferably relatively slight whereby the angular surface of the complementary threads stand at a relatively great angle to the direction of thrusts brought about during the operation of the machine. The angle $a$ should be sufficiently small so that thrusts in the direction of the axis of the screw will have little or no tendency to move the nut portions $3^e$ and $3^d$ outwardly in a direction transverse to the screw axis and when so constructed the two nut portions although movable in a direction transverse to the axis of the screw will support operating thrusts in a manner substantially similar to a solid nut but with the advantages described.

Having now fully explained my invention, I claim:

1. In a machine tool the combination of a plurality of relatively movable supports, a screw journaled in one of said supports but fixed against axial movement relative thereto, a nut engaging said screw and fixed against bodily movement relative to the other support but formed to provide portions on opposite sides of the axis of said screw and relatively movable toward one another, said screw and nut having thread sides angularly disposed for mutual engagement to limit the relative movement of said nut portions and means yieldably continuously urging each of said nut portions in the directions mentioned.

2. In a machine tool, the combination of a movable support, a screw for movement thereof, a nut engaging said screw and having a portion movable relative to the screw in a direction transverse to the direction of movement of said support, and means yieldably continuously urging said relative movement, said screw and nut having complementary thread surface portions disposed for mutual engagement and to limit said movement.

3. In a machine tool, the combination of a movable support, a screw for movement thereof, a nut for said screw and having a portion movable relative to the screw in a direction transverse to the direction of movement of said support, and means yieldably continuously urging said relative movement, said screw and nut having complementary thread surface portions disposed for mutual engagement to limit the amount of said movement, and having clearance space at the top and bottom of the threads thereof whereby to provide clearance for said movement after wear takes place.

4. In a machine tool the combination of a movable support, a screw for movement thereof, a nut engaging said screw and having a portion movable when said screw is disassembled from said nut into a position of interference with re-assembly of said screw; said screw being provided with an end thread portion of reduced size adapted for engagement with said nut portion without movement thereof when said nut portion is in its interfering position.

5. In a machine tool the combination of a movable support, a screw for movement thereof, a nut engaging said screw and having a portion movable when said screw is disassembled from said nut in a direction transverse to the direction of support movement and into a position of interference with re-assembly of said screw; said screw being provided with an end thread portion of reduced size adapted to engage with said nut portion without movement thereof when said nut portion is in said interfering position; said screw end portion being connected with said screw by another screw portion of gradually increasing size.

6. The combination of a movable support, a screw for movement thereof, a nut threadedly engaging said screw, thread portions of said nut and screw being relatively movable for increasing the engagement thereof and means yieldably continuously urging said relative movement, the threads of said screw and nut being formed for said relative movement to eliminate axial lost motion therebetween.

In witness whereof I hereto affix my signature.

FRED A. PARSONS.